(12) United States Patent
Enoch, III et al.

(10) Patent No.: US 7,506,612 B2
(45) Date of Patent: Mar. 24, 2009

(54) MULTIFUNCTION AQUARIUM CLEANING DEVICE

(75) Inventors: Duard W. Enoch, III, 429 Pacific Oaks Rd., Goleta, CA (US) 93117; Harry Linden, Goleta, CA (US)

(73) Assignee: Duard W. Enoch, III, Santa Barbara, CA (US)

( * ) Notice: Subject to any disclaimer, the term of this patent is extended or adjusted under 35 U.S.C. 154(b) by 249 days.

(21) Appl. No.: 11/164,161

(22) Filed: Nov. 12, 2005

(65) Prior Publication Data

US 2007/0107665 A1    May 17, 2007

(51) Int. Cl.
*A01K 63/04* (2006.01)
*A47L 1/00* (2006.01)

(52) U.S. Cl. ..................... 119/264; 15/220.2
(58) Field of Classification Search ................. 119/264; 15/220.2, 103, 220.1
See application file for complete search history.

(56) References Cited

U.S. PATENT DOCUMENTS

| | | | |
|---|---|---|---|
| 3,208,090 A | | 9/1965 | Roesel |
| 4,775,485 A | * | 10/1988 | Etani .......................... 210/696 |
| 6,206,978 B1 | | 3/2001 | Tsui |
| 6,422,746 B1 | * | 7/2002 | Weiss et al. .................. 374/156 |
| 6,988,290 B2 | * | 1/2006 | Enoch et al. ................... 15/103 |
| 7,229,210 B2 | * | 6/2007 | Yim, II ........................ 374/208 |
| 2002/0112303 A1 | | 8/2002 | Hanson |
| 2004/0031118 A1 | | 2/2004 | Hanson |

FOREIGN PATENT DOCUMENTS

| | | |
|---|---|---|
| GB | 2105977 A | 4/1983 |
| JP | 06142013 | 5/1994 |
| JP | 0994039 | 4/1997 |
| JP | 09289959 | 11/1997 |
| WO | 2004026078 A1 | 4/2004 |

* cited by examiner

*Primary Examiner*—Michael R Mansen
*Assistant Examiner*—Monica L Williams
(74) *Attorney, Agent, or Firm*—Felix L. Fischer

(57) ABSTRACT

An aquarium cleaning device having an inner component with a plate employing a cleaning surface and an alternative cleaning element operative on a second surface opposite the cleaning surface. A magnetic element is carried by the plate and means for providing orienting buoyancy is carried adjacent one end of the plate. An outer component has a body with a surface for engaging the exterior of an aquarium wall. A second magnetic element is carried by the body such that the body is positionable for magnetic attraction between the magnetic elements with the cleaning surface adjacent the aquarium wall or with the second surface adjacent the aquarium wall. By moving the body between the first and second positions, the inner component is flipped within the aquarium to alternate the cleaning elements.

22 Claims, 12 Drawing Sheets

MULTIFUNCTION AQUARIUM CLEANING DEVICE

FIELD OF THE INVENTION

This invention relates generally to the field of aquarium surface cleaning devices and, more particularly, to a magnetically coupled multifunction inner cleaning element for a surface controlled, actuated and positioned by an external unit located on the surface opposite from the surface being cleaned.

BACKGROUND OF THE INVENTION

Cleaning of aquarium interior surfaces which are difficult to access or have other limitations, require specialized cleaning devices. In the aquarium art it is desirable to be able to clean the interior of the glass or clear plastic walls without draining the tank or reaching into the water. The currently available devices for cleaning the interior surface of the aquarium wall use two oppositely charged magnets carried in specially adapted housings.

The first magnet is positioned on the outside of the glass with the second magnet on the inside of the glass in the tank. The second magnet has a covering of a rough or abrasive substance as a cleaning surface to scrape off algae and other materials adhered to the glass. The outer magnet case has a smooth resilient surface to avoid scratching or marring the external surface of the glass. The magnets are positioned adjacent one another on the internal and external surfaces of the glass. The internal magnet is attracted to the external magnet. The external magnet is moved by hand over the glass with the internal magnet following the motion. This induced motion of the internal magnet moves the cleaning surface across the inner surface of the glass to clean the glass. An example of this type of device is disclosed in U.S. Pat. 6,348,104 entitled DEVICE AND METHOD FOR CLEANING AQUARIUM WINDOWS issued on Feb. 19, 2002 to Bakker.

The device in Bakker also has the property that upon disengagement of the internal and external magnetic devices, the internal element floats to the surface of the water in the aquarium for retrieval. However, this property prevents recovery of the internal element anywhere but on the surface of the water and floating buoyancy tends to uncouple the internal and external units. Current products like that disclosed in Bakker have weight or buoyancy distribution within the internal element such that immediately upon disengagement the polarized faces of the internal element magnets orient themselves in a perpendicular plane to the glass thus minimizing the chance for re-engagement.

It is therefore desirable to have a remotely actuated surface cleaning device capable of more vigorous cleaning action. It is further desirable to have a cleaning device with a reduced profile cleaning component for access to areas in which other objects are in close proximity to the glass thereby limiting accessibility. It is also desirable to have a flexible inner component to conform to convex or concave glass surfaces. It is also desirable to distribute the bouyancy proximate one end of the inner cleaning component such that the polarized magnet faces remain parallel to the aquarium glass upon disengagement thus greatly improving the ability to re-engage with the outer unit.

SUMMARY OF THE INVENTION

An aquarium cleaning device embodying the present invention incorporates an inner component having a plate with a cleaning surface and an alternative cleaning element operative on a second surface of the plate opposite the cleaning surface. A magnetic element is carried by the plate and means for providing orienting buoyancy is carried adjacent one end of the plate. An outer component is provided having a body with a surface for engaging the exterior of an aquarium wall. A second magnetic element is carried by the body such that the body is positionable in a first position for magnetic attraction between the first and second magnetic elements with the cleaning surface adjacent the aquarium wall in a second position for magnetic attraction between the first and second magnetic elements with the second surface adjacent the aquarium wall. By moving the body between the first and second positions orientation of the first and second magnetic elements is sequentially changed for repulsive force to flip the inner component within the aquarium then attractive force to draw the inner component back to the aquarium wall thus allowing additional cleaning features to be available.

BRIEF DESCRIPTION OF THE DRAWINGS

These and other features and advantages of the present invention will be better understood by reference to the following detailed description when considered in connection with the accompanying drawings wherein.

Figure 1:
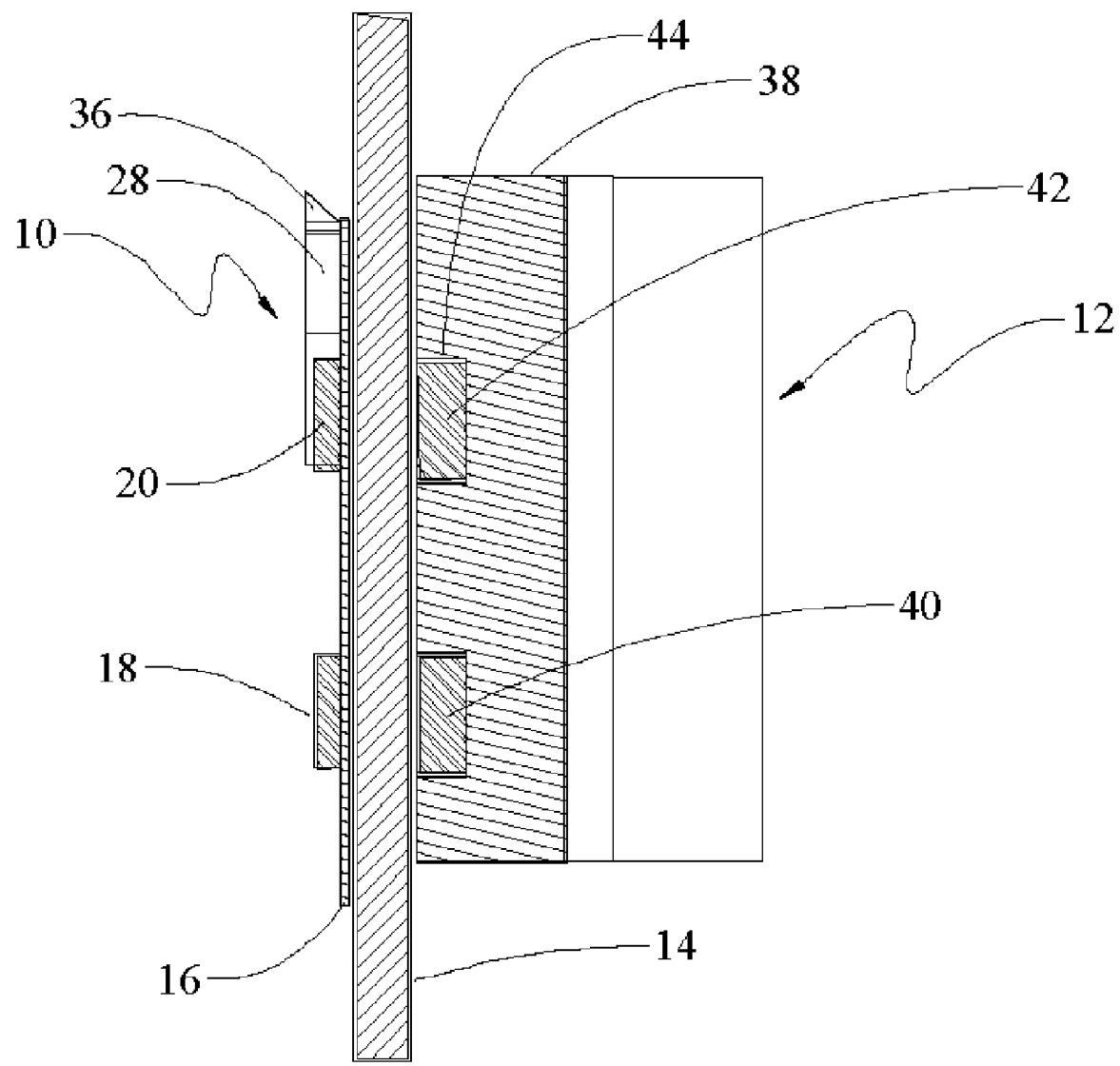
FIG. 1 is a side section view of the internal and external components of the cleaning system of a first embodiment of the invention operably engaged to the surfaces of an aquarium wall.
Figure 2A:
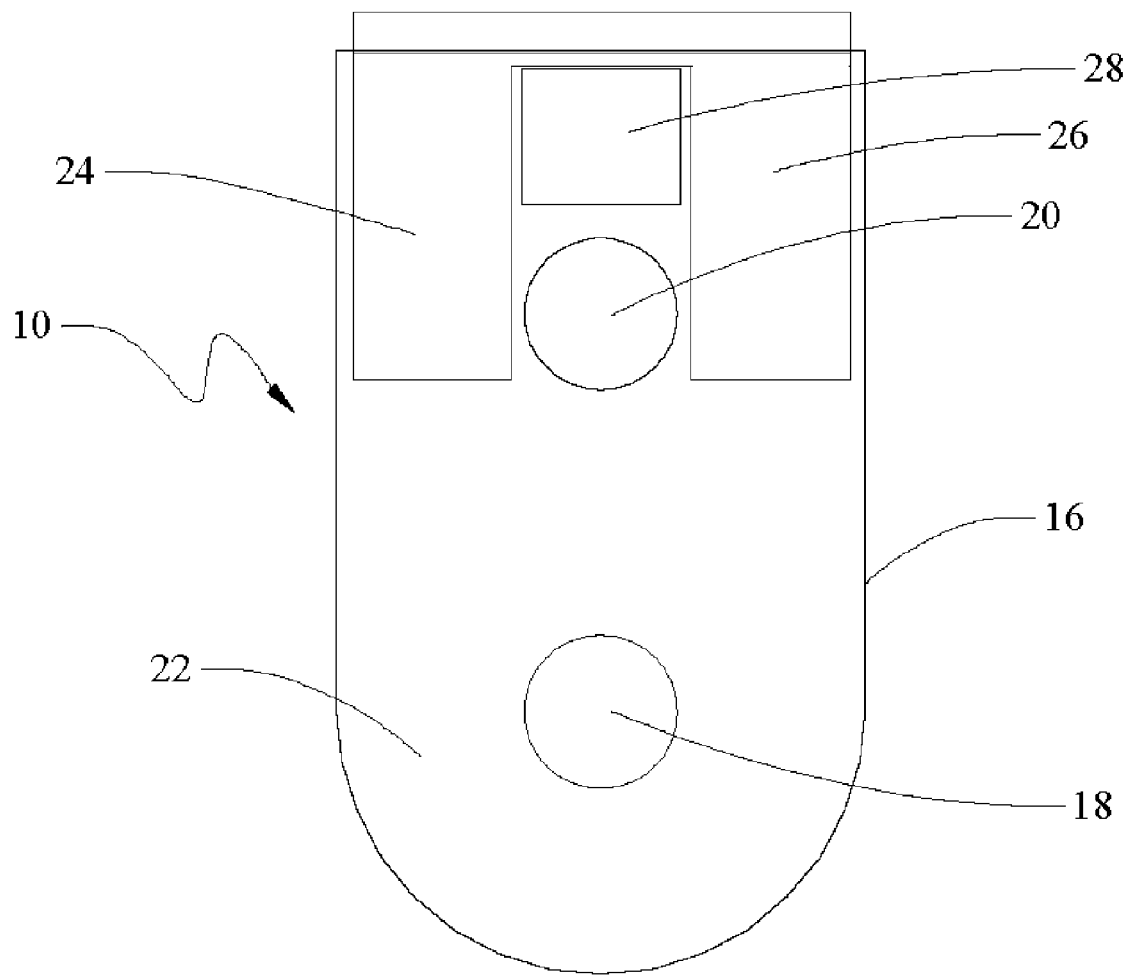
FIG. 2a is a back view of the inner cleaning component of a first embodiment of the present invention as disclosed in FIG. 1.
Figure 2B:
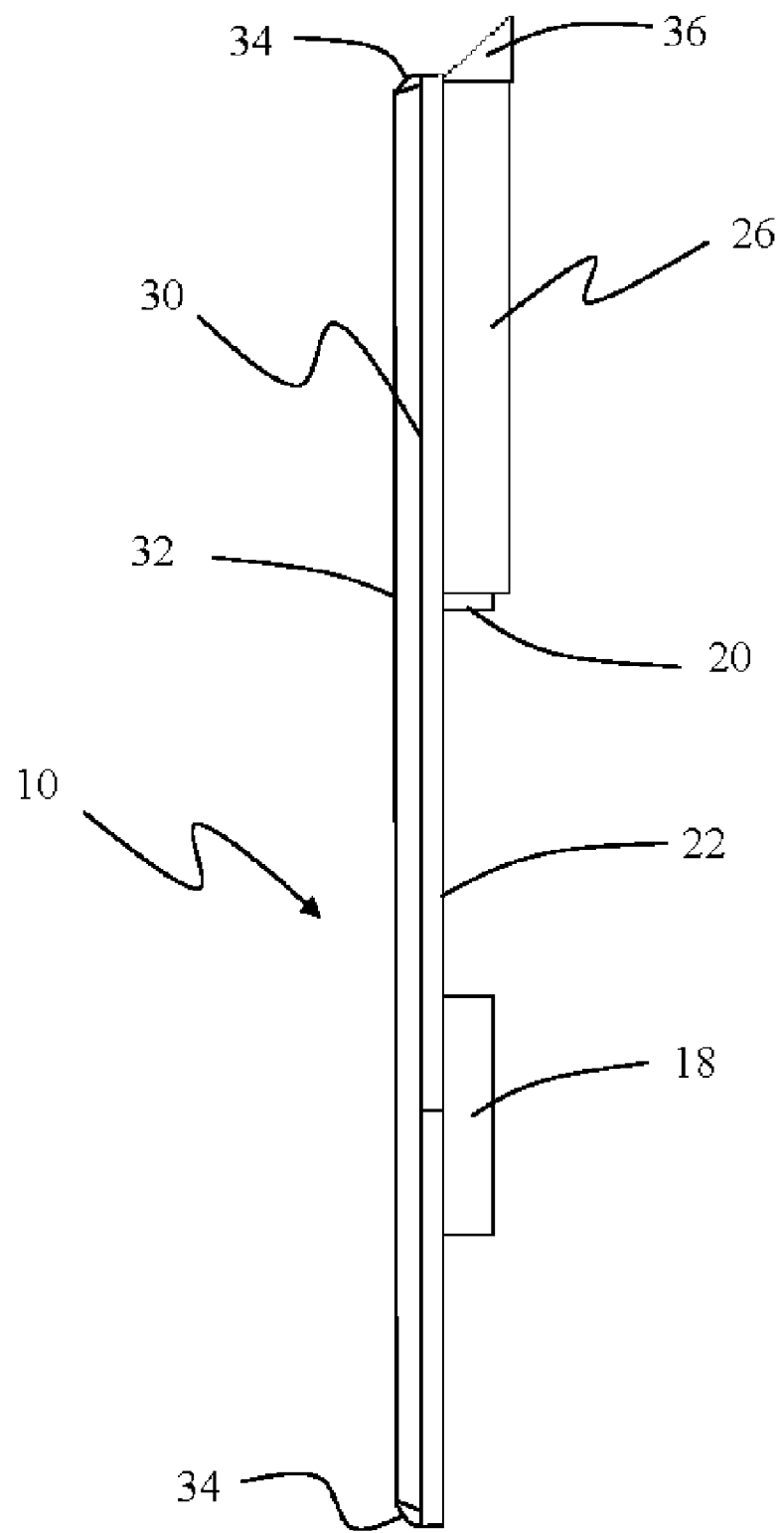
Figure 2C:
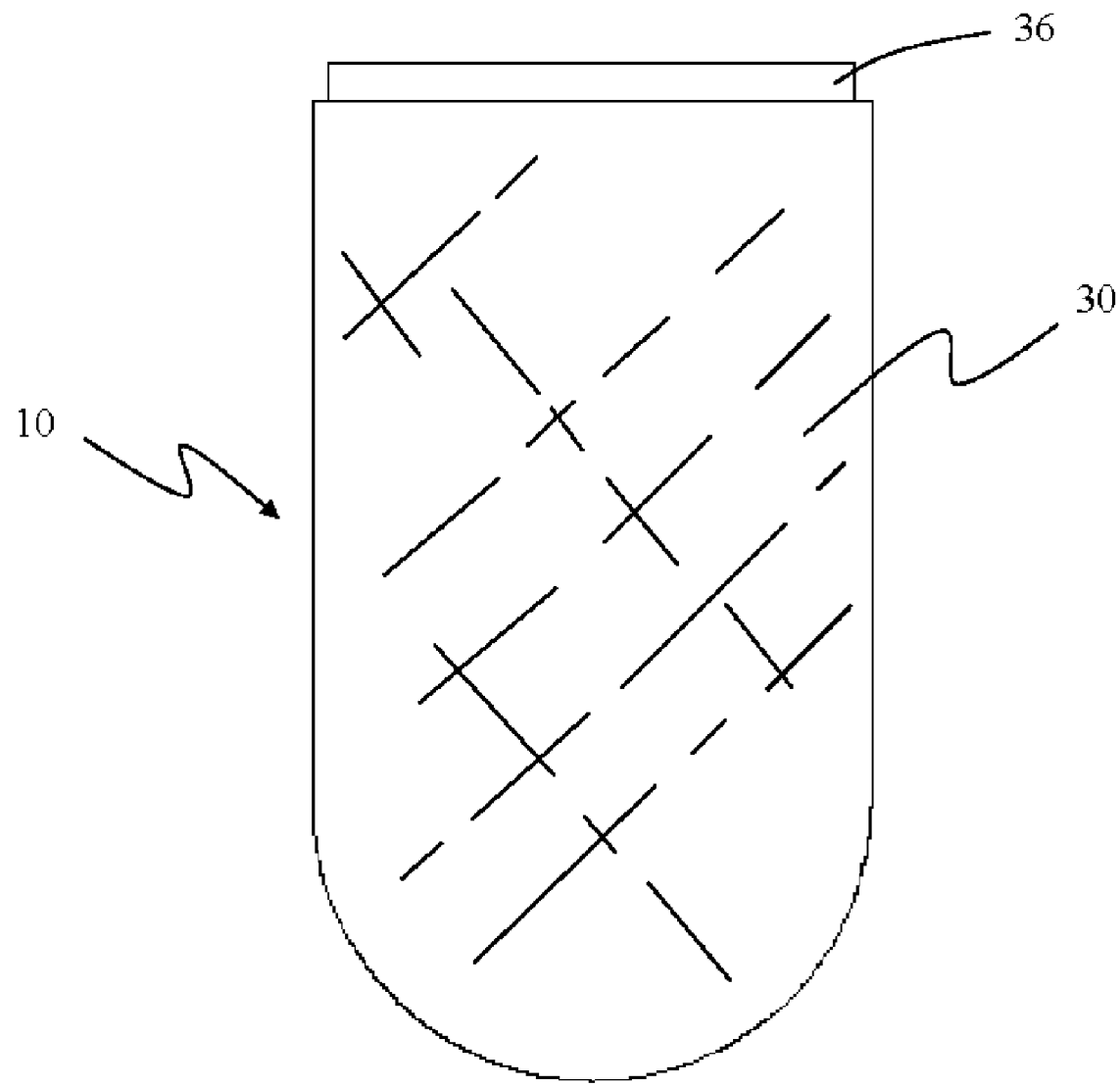
Figure 2D:
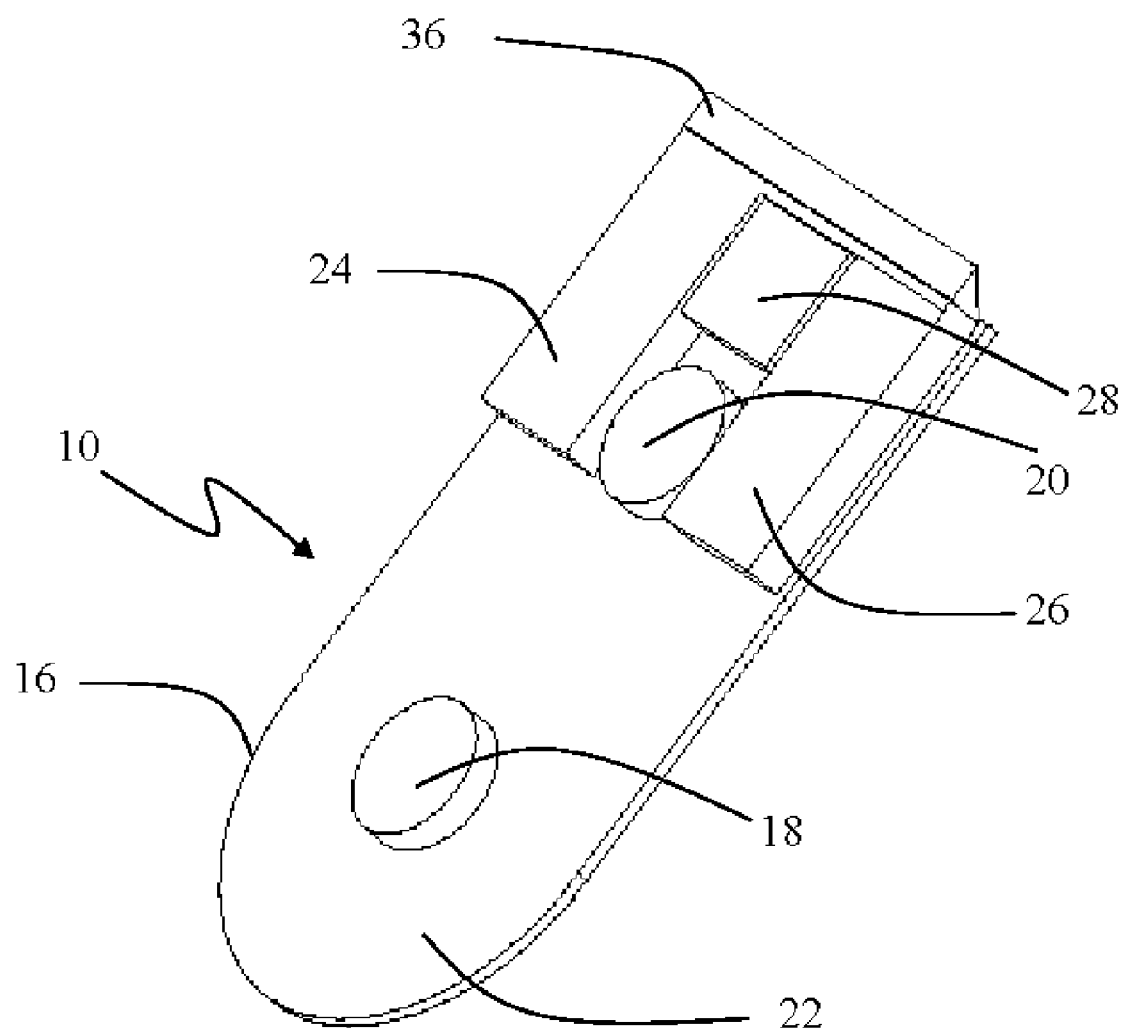
Figure 3A:
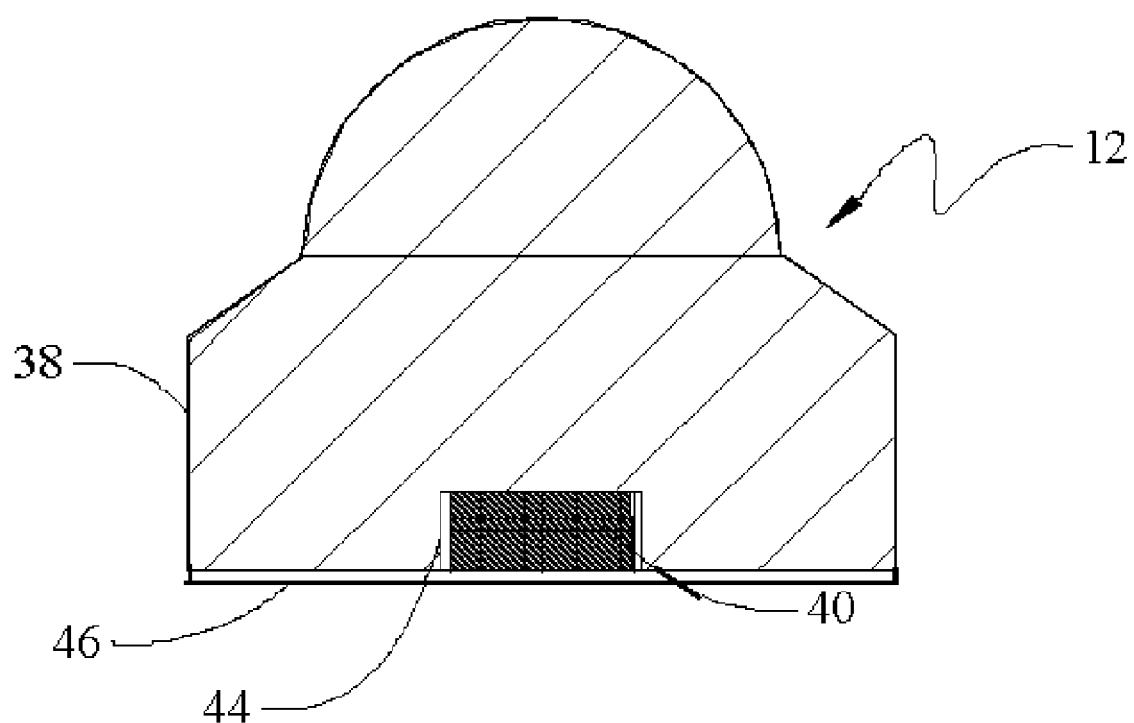
Figure 3B:
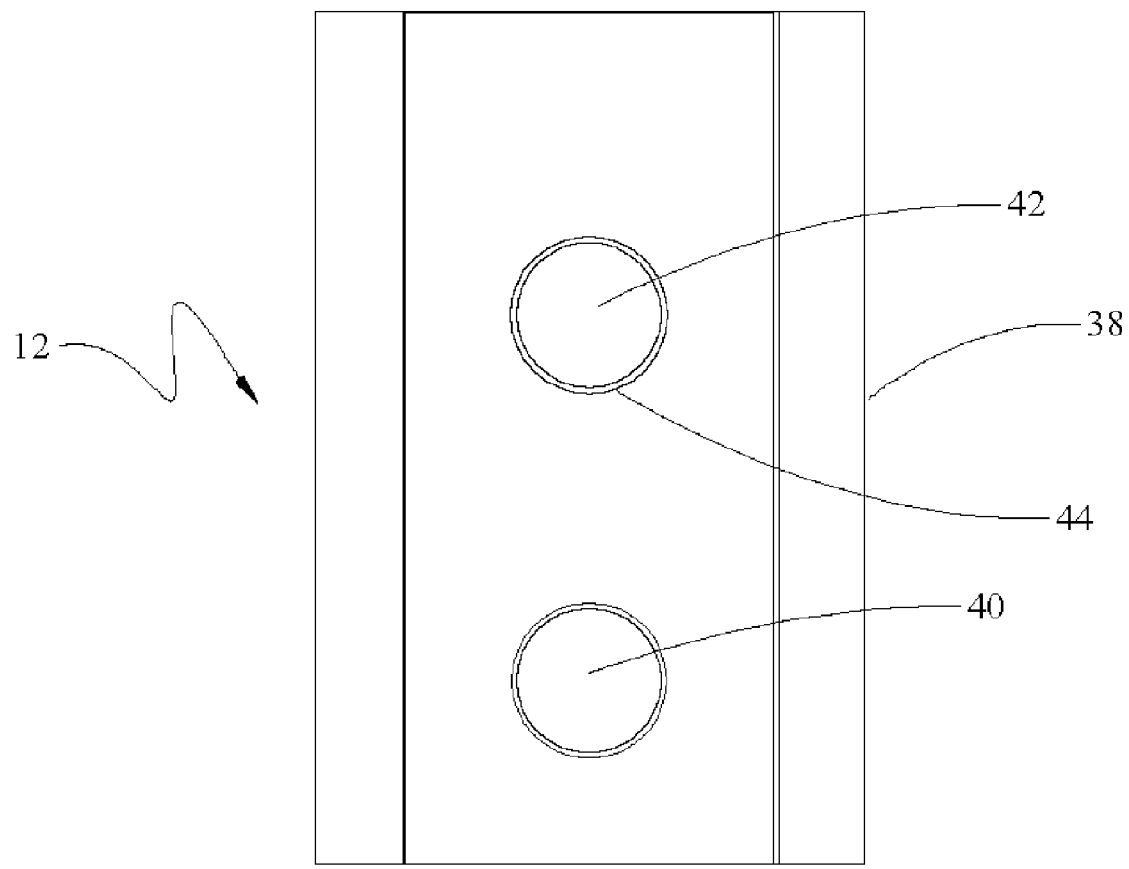
Figure 3C:
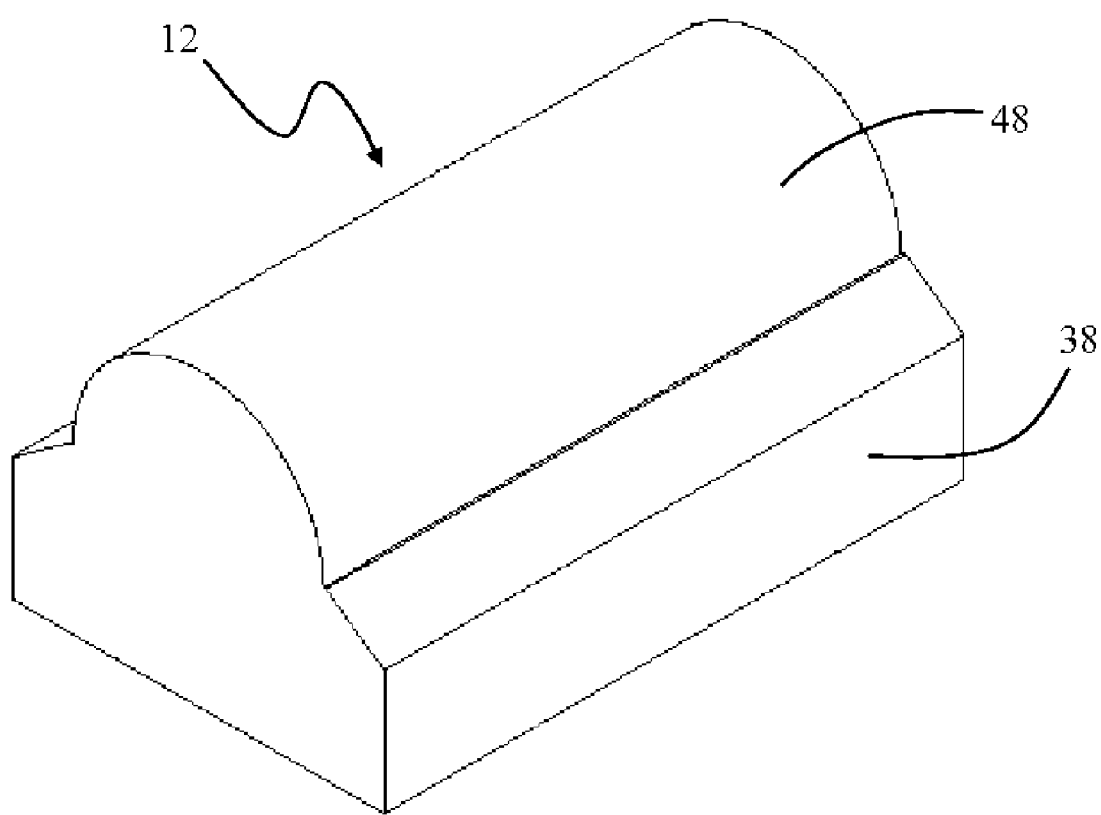
Figure 4A:
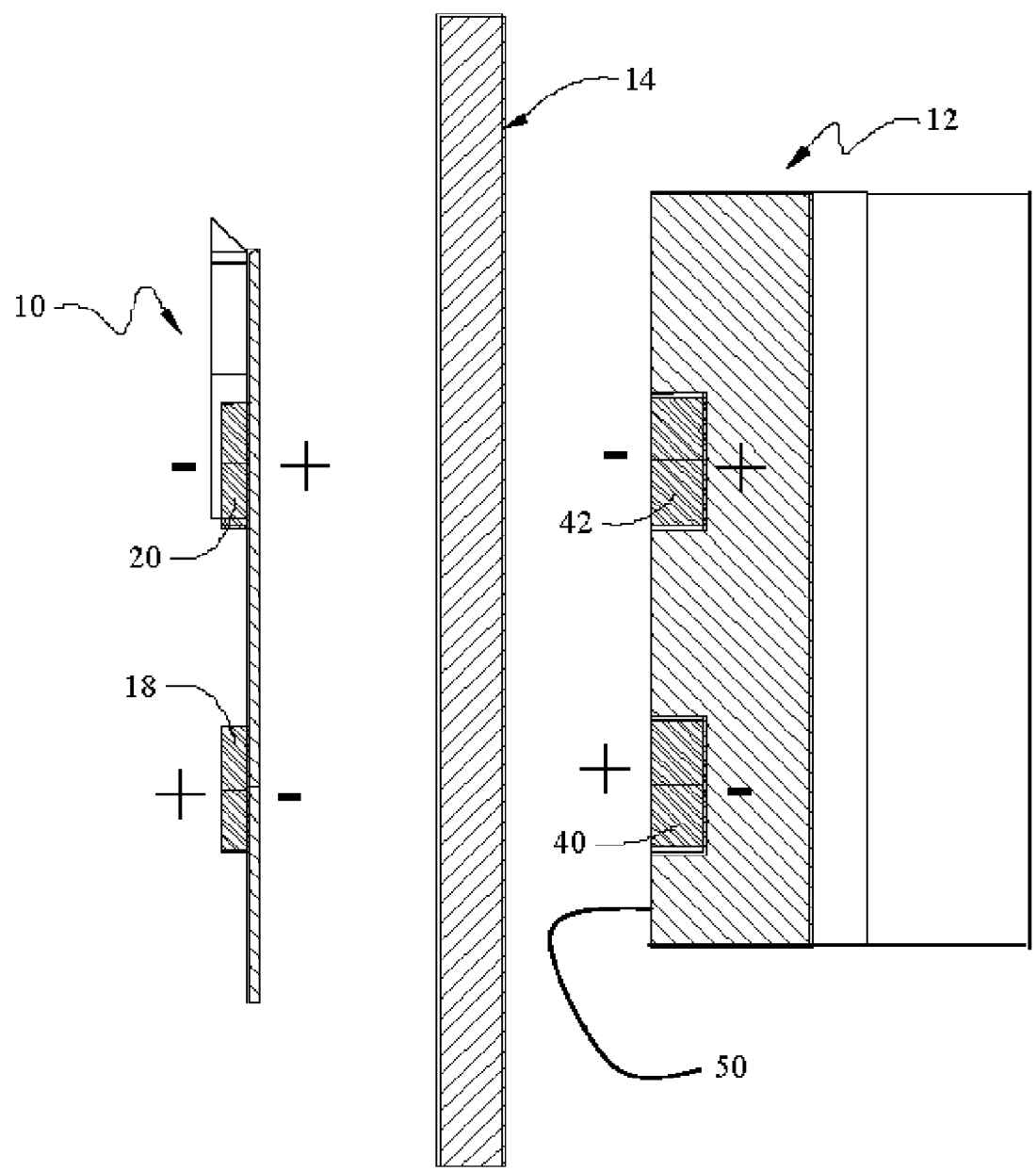
Figure 4B:
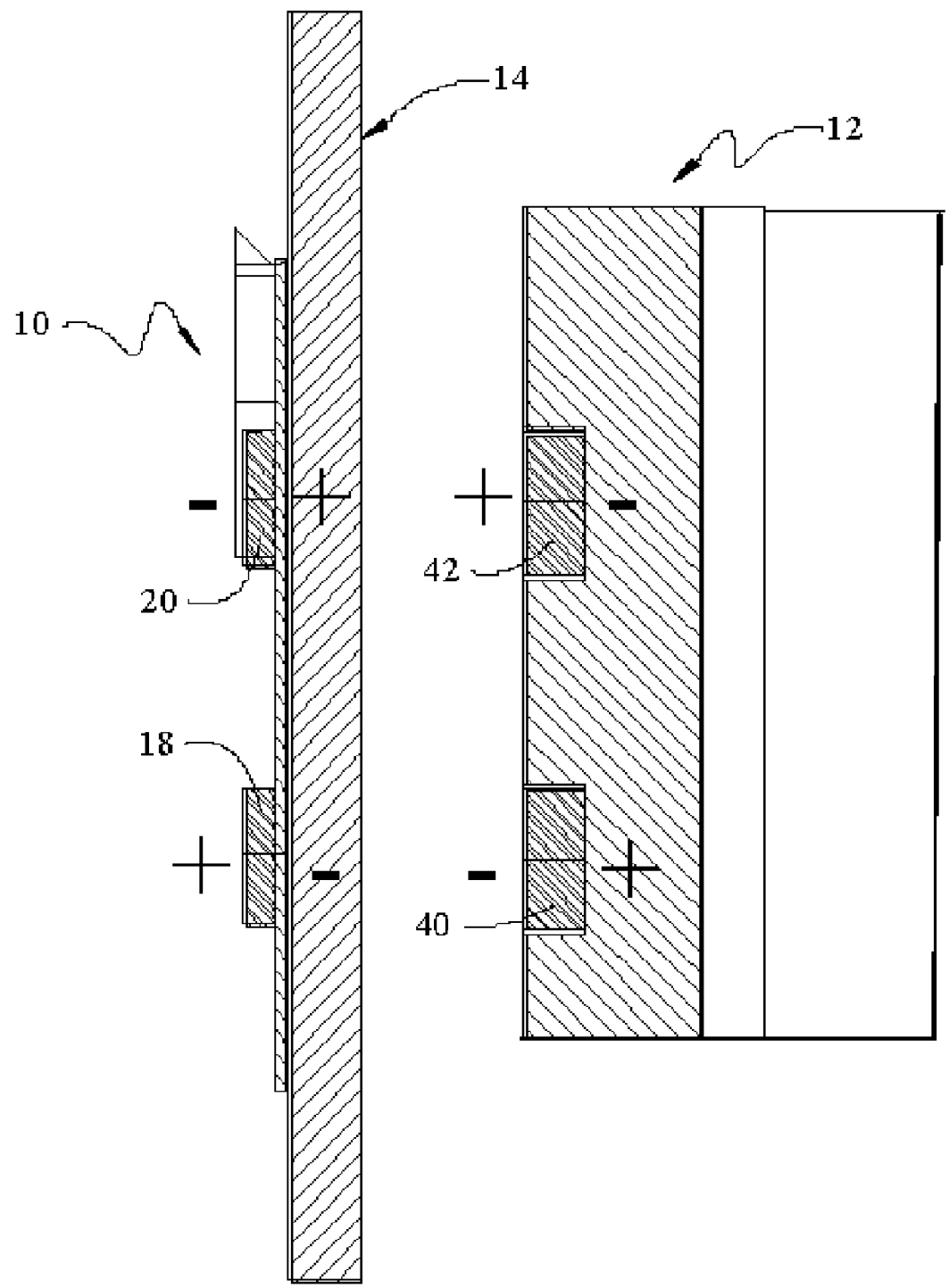
Figure 4C:
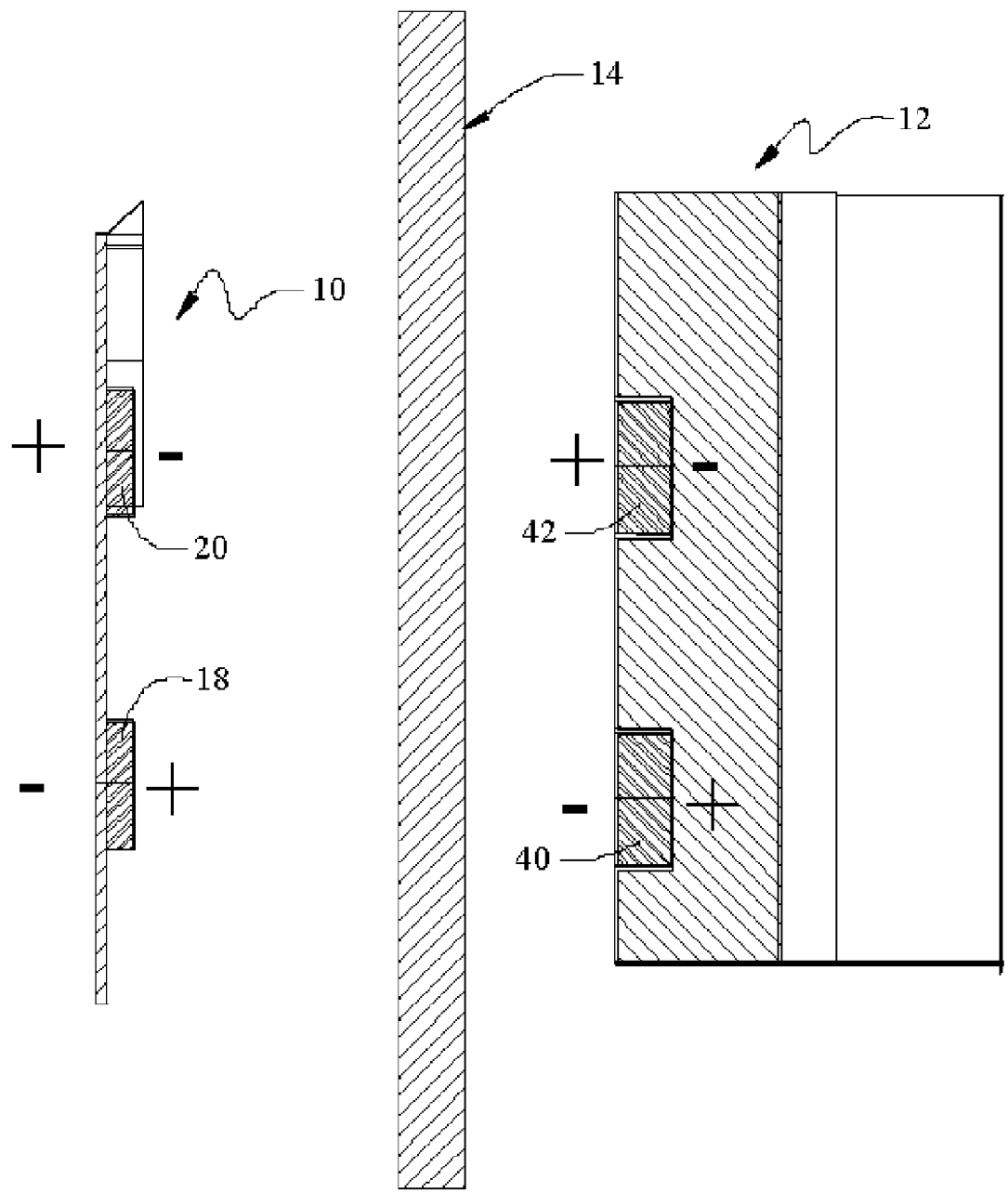
Figure 5A:
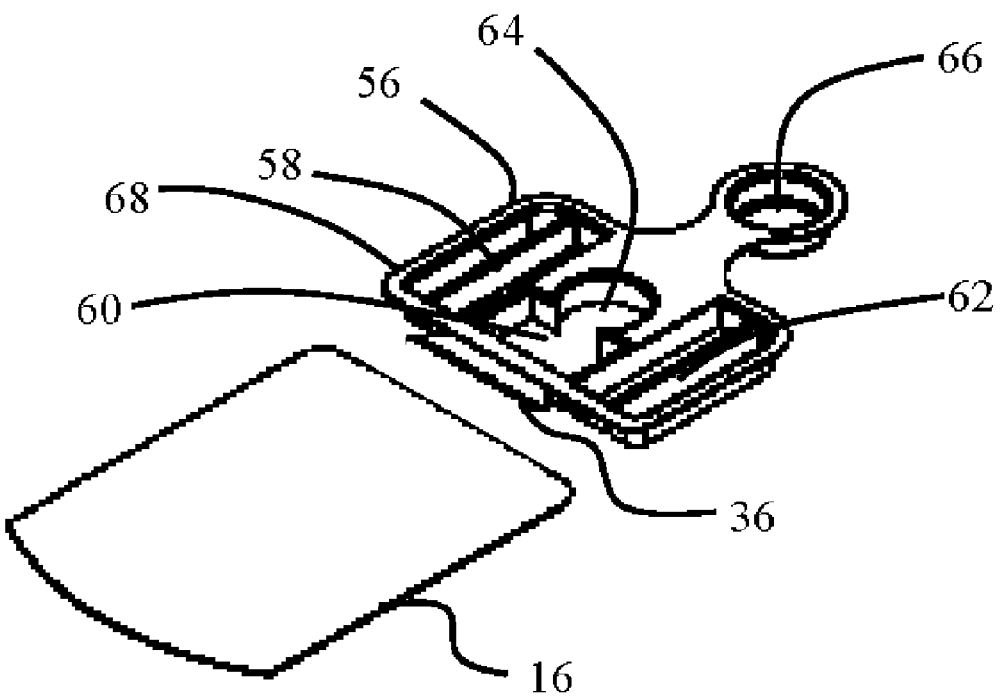
Figure 5B:
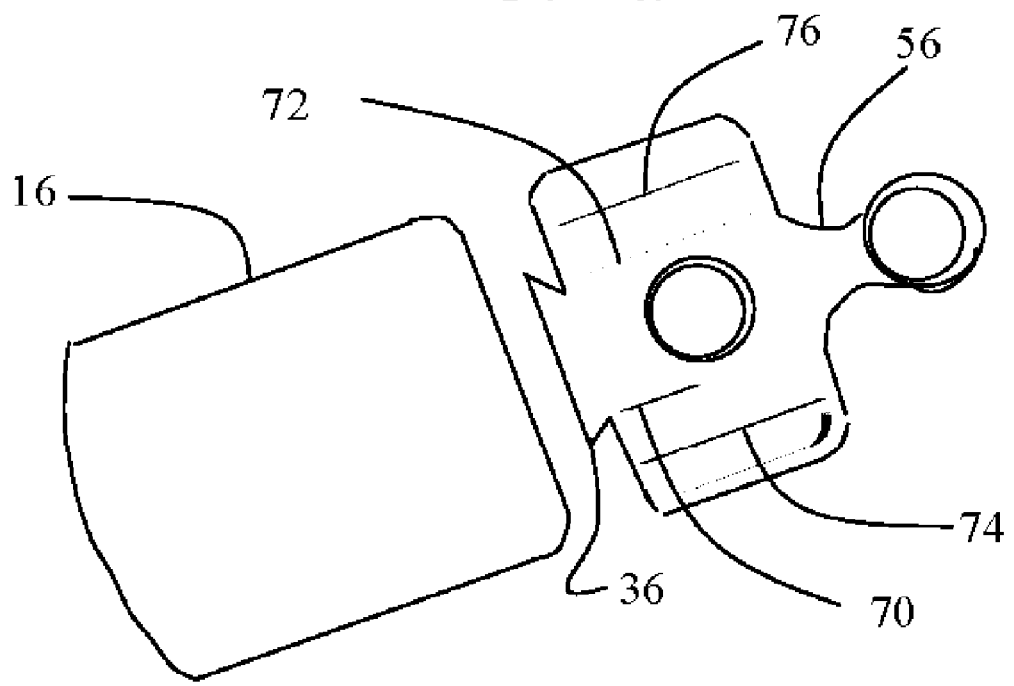

FIB. 2b is a side view of the inner cleaning component disclosed in FIG. 2a;

FIG. 2c is a front view of the inner cleaning component disclosed in FIG. 2a;

FIG. 2d is an isometric view of the inner cleaning component;

FIG. 3a is a side section view of the outer actuation component disclosed in FIG. 1;

FIG. 3b is a front view of the outer actuation component;

FIG. 3c is an isometric view of the outer actuation component;

FIG. 4a is an exploded side view of the components of the internal and external components of the invention showing the relationship of the magnetic elements in the first position;

FIG. 4b is a view of the components of the invention with the external actuating component reversed to flip the internal component;

FIG. 4c is a view of the components after the internal component has been flipped;

FIG. 5a is a top isometric view of an exemplary perform elements for manufacture of the internal cleaning component; and, FIG. 5b is a bottom isometric view of the perform elements of FIG. 5a.

DETAILED DESCRIPTION OF THE INVENTION

Referring to the drawings, FIG. 1 shows an internal cleaning component 10 and an external actuating component 12 of a cleaning system employing the present invention. The internal and external components are shown as they are employed in use operably engaged magnetically through a glass or plastic wall 14 of an aquarium. FIGS. 2a, 2b and 2c show an embodiment of the cleaning or internal component of a device according to the present invention. A resiliently flexible plate 16 carries a pair of magnets 18 and 20 mounted to or molded in a back surface 22 of the plate. The magnets are mounted with opposite polarity for utility to be described in greater detail subsequently. High strength magnets such as rare earth or neodynium type magnets are employed in exemplary embodiments. Additionally, chambers 24, 26 and 28 are positioned on an upper portion of the plate. The chambers are filed with foam, air or gas filling to provide buoyancy and are of a precalibrated size based on the weight of the internal component as a whole to provide neutral or slightly negative buoyancy at a nominal mid depth of the aquarium. Alternative buoyancy elements or filling such as wood, including balsa or other appropriate density species, are employed in alternative embodiments. Also in alternative embodiments, the chamber volume may be modified for neutral buoyancy at different depths for use in large aquariums having greater depth or there may be more or fewer chambers as needed. Distributed buoyancy within the inner unit is arranged in any fashion that naturally moves the magnet faces away from the orientation perpendicular to the aquarium wall common in the prior art with the method disclosed herein being buoyancy added to one end such that the inner unit magnets maintain a parallel orientation upon disengagement or descent.

For the embodiment shown the three chambers are positioned in a U shape around the top magnet 20. The spacing of the lower magnet from the upper magnet and the weight of the lower magnet assist in maintaining the upright orientation of the internal component in its neutral or negatively buoyant state. As most clearly seen in FIG. 2c, an abrasive element covers substantially the entire front surface 30 of the inner component. The abrasive face is physically embossed on the front surface in certain embodiments of the invention. In alternative embodiments, an abrasive pad 32 (as shown in FIG. 2b) is attached to the front surface. This allows replacement of the pad upon loss of effectiveness due to wear or excessive contamination by the algae or other materials cleaned from the aquarium surface. The pad employs a self adhesive backing in certain embodiments and is physically restrained in channels or clips 34 in alternative embodiments. An exemplary material for the pad is Trizact Film, 268XA in 5 micron thickness with a PSA adhesive backing as produced by 3M Company. In certain of these embodiments as shown in FIG. 2c, the depth and resilience of the pad is sufficient to avoid contact of the channels with the aquarium surface to avoid marring and to assure intimate contact of the cleaning pad with the surface to be cleaned.

The resilient flexibility of the inner component allows the front surface to conform to curved surfaces in the aquarium allowing the abrasive face to remain in intimate contact with the surface for enhanced cleaning. Additionally, the slim profile afforded by fabrication of the inner component according to the present invention allows the inner component access to areas behind tank equipment and between the aquarium wall and rocks or other ornaments and decorations within the aquarium that may be placed near the wall not typically accessible with other cleaning devices. The thin cross section of the flexible plate of the inner component below the lower magnet allows the abrasive surface to pass between the substrate, typically sand, placed in the bottom of the aquarium and the adjacent glass to allow cleaning below the sand line.

For the embodiment shown in the drawings, a scraper 36 extends from the rear surface as a secondary cleaning element. For the embodiment shown, the scraper is integral to and comprises an upper outside edge of the chambers. In alternative embodiments, a separate scraper element is attached to the inner component. A slightly outwardly curved plastic blade is effective in certain embodiments providing the necessary scraping action against the aquarium glass surface. This blade is molded into the inner component or attached using adhesive or mechanical fasteners. For effective use of the scraper, the inner component must be reversed for opposite contact with the aquarium surface. The present invention provides the ability to accomplish this without removal or handling of the inner component as will be described in greater detail subsequently. In alternative embodiments, the secondary cleaning element is a second abrasive surface with more aggressive or alternative abrasive to allow additional cleaning.

As shown in FIGS. 3a-3c, the external actuating component 12 incorporates a body 38 in which a mating pair of magnets 40 and 42 are mounted. As with the internal cleaning component, the magnets 40 and 42 are mounted in the body with opposite polarity. In certain embodiments, the magnets are molded into the body while in alternative embodiments the body is molded with recesses 44 to receive the magnets which are press fit or adhesively bonded within the recesses. A surface covering 46 is employed in certain embodiments depending on the material chosen for the body for interface with the aquarium exterior surface to avoid marring. The surface covering in exemplary embodiments is a micro fiber cleaning cloth such as Swift microfiber cloth which cleans the exterior surface of the aquarium wall without solvents. The cleaning cloth is affixed in selected embodiments with a light bonding adhesive such as used with 3M post-its so that it can be exchanged when dirty. In alternative embodiments, one or more Velcro moieties are attached to the cleaning cloth with the mating moieties affixed to the body for attachment of the cloth. The embodiment of the invention as disclosed herein therefore allows simultaneously cleaning of the inside and outside of the aquarium wall. For the embodiment shown, the body is sculpted to incorporate a handle portion 48 for ease of manipulation of the outer component.

As shown in FIGS. 4a-4c, the polarity of the magnets as mounted in the inner and outer components provides novel functionality. In a first position shown in FIG. 4a, the outer component is placed adjacent the aquarium surface in a first orientation with magnet 40 having a positive polarity adjacent bottom surface 50 of the body and magnet 42 having a negative polarity adjacent the bottom surface. The inner component is oriented with magnet 20 having a positive polarity adjacent and attracted to magnet 42 while magnet 18 having a negative polarity adjacent and attracted to magnet 40 providing magnetic engagement between the inner and outer components. In this orientation, the inner component has the abrasive cleaning surface 30 adjacent the aquarium surface for cleaning and motion of the outer component on the outer surface of the aquarium will be followed by the inner component.

By disengaging and rotating the outer component 180° about an axis perpendicular to the aquarium wall to the position shown in FIG. 4b, with like polarity on the adjacent magnets in the inner and outer components and placing the outer component next to the aquarium surface, the resulting repulsion of the magnets in the two components will result in the inner component being driven from the aquarium inner surface. The basic instability of the repulsion between the two components will result in the inner component rotating in the water to "flip". In this configuration, now shown in FIG. 4c, the polarities of the adjacent magnets in the inner and outer component will again be opposite. The inner component will again be attracted to the outer component and once again be drawn to the inner surface of the aquarium. The neutral or negative buoyancy provided by the chambers in the inner component maintains the substantially vertical orientation of the inner component during the "flip" and substantially maintains the floating depth within the aquarium. If slight sinking of the inner component occurs, the outer component is easily aligned to provide greatest attraction forces between the magnets to draw the inner component to the wall. In this configuration, the opposite side of the inner component is now adjacent the aquarium surface bringing the scraper into contact for disengaging algae build-up or other contamination of the aquarium inner surface.

The inner surface of the aquarium can therefore easily be cleaned using the abrasive surface of the inner component with the "flip" accomplished to engage the scraper when necessary and an additional "flip" to reengage the abrasive. If the external component is removed from the aquarium wall, the inner component will remain in proper orientation with the plate and magnets in a plane substantially parallel to the aquarium wall for reengagement. The slight negative buoyancy of the embodiment disclosed herein will result in the inner component slowly sinking until the bottom edge contacts the aquarium bottom. The inner component will remain upright to be reengaged by the outer component when desired.

In an alternative embodiment, the polarities of the magnets in the inner component are commonly oriented and the magnets in the outer component are commonly oriented. The outer component is substantially a rectangular box. In this case, rotation of the outer unit to create attractive or repulsive polarity with the inner unit is accomplished by rotating the outer unit about an axis parallel to the aquarium wall. For this configuration, the two opposing face surfaces of the outer component are provided with a surface covering for cleaning of the outer surface of the aquarium.

In yet another alternative embodiment, the magnetic elements employed in the inner and outer components are bar magnets and orientation of the components is accomplished by orienting the polarities at the opposite ends of the bars. In this embodiment, greater buoyancy may be required to offset the tendency of the inner component to rotate parallel to the aquarium wall as opposed to flipping in surface orientation.

FIGS. 5a and 5b show an exemplary molding for manufacture of the inner component according to the present invention. The molding provides the flexible plate 16 which attaches to a contoured element 56. The contoured element includes molded recesses creating volumes 58, 60 and 62 for the chambers and receivers 64 and 66 for the upper and lower magnets. A lip 68 having a periphery sized to be encompassed within the dimensions of the plate surrounds the contoured element. Subsequent to molding, the magnets are inserted in to the receivers, sealing adhesive is applied to the lip and the contoured element is adhesively bonded onto the plate. In this configuration, the volumes and receivers are sealed against the plate providing the buoyant chambers and restraining the magnets.

As best seen in FIG. 5b for this exemplary embodiment, the volumes 58 and 62 are separated from the central volume 60 by grooves 70 and 72 and further contain additional grooves 74 and 76 which reduce the rigidity of the chamber shapes. This provides structural relief which allows the flexibility of the upper portion of the plate to be substantially retained for conforming to curved surfaces in the aquarium.

In alternative embodiments, the inner component is molded in a single piece with fold lines to accommodate folding the contoured component back onto the plate. The inner component is assembled subsequent to molding by inserting the magnets into the receivers, applying sealing adhesive to the lip and the contoured element is folded back in alignment with and secured onto the plate. In this configuration, the volumes and receivers are sealed against the plate providing the buoyant chambers and restraining the magnets.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. An aquarium cleaning device comprising:
   an inner component having
   a plate with a cleaning surface,
   a first magnetic element carried by the plate, a first polarity of the magnetic element fixed for association with the cleaning surface;
   an alternative cleaning element selected from the set of a scraper and an abrasive cleaning surface operative on a second surface of the plate opposite the cleaning surface and associated with a second polarity of the magnetic element, and an outer component having
   a body with a surface for engaging an exterior surface of an aquarium wall, and
   a second magnetic element carried by the body;
   the body positionable in a first position for magnetic attraction between the first polarity of the first magnetic element and the second magnetic element with the cleaning surface adjacent the aquarium wall and removably positionable in a second position for initial magnetic repulsion followed by magnetic attraction between the second polarity of the first magnetic element and the second magnetic element with the second surface adjacent the aquarium wall, moving the body between said first and second positions sequentially causing orientation of the first and second magnetic elements for repulsive force to flip the inner component within the aquarium then attractive force to draw the inner component to the wall.

2. An aquarium cleaning device as defined in claim 1 wherein the plate is resiliently flexible.

3. An aquarium cleaning device as defined in claim 1 wherein
   the first magnetic element comprises a first magnet mounted to the plate with a first polarity perpendicular to the plate and a second magnet mounted to the plate with a second polarity perpendicular to the plate; and,
   the second magnetic element comprises a third magnet mounted in the body with a polarity substantially opposite to the first magnet and a fourth magnet mounted in the body with a polarity substantially opposite to the second magnet.

4. An aquarium cleaning device as defined in claim 3 wherein the abrasive pad is adhesively attached to the plate.

5. An aquarium cleaning device as defined in claim 1 wherein the cleaning surface incorporates an abrasive pad.

6. An aquarium cleaning device as defined in claim 1 wherein the selected alternative cleaning element is a scraper, said scraper extending from the plate.

7. An aquarium cleaning device as defined in claim 1 wherein a covering is attached to the surface of the body engaging the aquarium wall.

8. An aquarium cleaning device as defined in claim 7 wherein the covering is a cleaning cloth.

9. An aquarium cleaning device as defined in claim 1 further comprising means for providing orienting buoyancy proximate one end of the plate.

10. An aquarium cleaning device as defined in claim 9 wherein the orienting buoyancy means comprises at least one buoyant chamber proximate said one end of the plate.

11. An aquarium cleaning device as defined in claim 10 wherein the at least one chamber includes a wall extending proximate a top edge of said one end of the plate and the alternative cleaning element is a scraper integral with the wall.

12. An aquarium cleaning device as defined in claim 10 wherein the at least one buoyant chamber is a sealed gas filled chamber.

13. An aquarium cleaning device as defined in claim 10 wherein the at least one buoyant chamber is filled with buoyant material.

14. An aquarium cleaning device as defined in claim 9 wherein the means for providing orienting buoyancy is incorporated in a contoured molded element having a plurality of volumes and two recesses sized to receive the first and second magnets, the molded element sealingly adhered to the plate, the volumes when sealed providing gas filled buoyant chambers.

15. An aquarium cleaning device as defined in claim 14 wherein the plate is resiliently flexible and the contoured molded element incorporates grooves across the molded volumes for structural relief to maintain flexibility of the plate.

16. An aquarium cleaning device as defined in claim 9 wherein the orienting buoyancy means provides neutral to slightly negative buoyancy.

17. An aquarium cleaning device as defined in claim 9 wherein the means for providing orienting buoyancy is incorporated in a contoured molded element having a plurality of volumes and two recesses sized to receive the first and second magnets, the molded element adhered to the plate, the volumes providing buoyant chambers filled with buoyant material.

18. An aquarium cleaning device comprising:
an inner component of substantially neutral buoyancy having
a plate with a cleaning surface and a scraper element attached opposite the cleaning surface,
means for providing orienting buoyancy proximate one end of the plate, and,
a magnetic element carried by the plate, and
an outer component having
a body with a surface for engaging an exterior surface of an aquarium wall, and
a second magnetic element carried by the body;
the body positionable for magnetic attraction between the first and second magnetic elements with the scraper element adjacent an inner surface of the aquarium wall for attractive force to draw the inner component to the inner surface and motion of the body is mirrored by motion of the inner component urging the scraper element along the inner surface.

19. An aquarium cleaning device as defined in claim 18 wherein
the magnetic element has a first polarity associated with positioning of the scraper element on the plate and a second polarity associated with positioning of a second surface on the plate; and,
the body is positionable in a first position for magnetic attraction between the first and second magnetic elements with the scraper element adjacent the aquarium wall and removably positionable in a second position for initial magnetic repulsion followed by magnetic attraction between the first and second magnetic elements with a second surface adjacent the aquarium wall, moving the body between said first and second positions sequentially causing orientation of the first and second magnetic elements far repulsive force to flip the inner component within the aquarium then attractive force to draw the inner component to the wall.

20. An aquarium cleaning device comprising:
an inner component having
a plate with a cleaning element attached thereto,
a magnetic element carried by the plate having a first polarity associated with the cleaning element,
means for providing orienting buoyancy;
an alternative cleaning element selected from the set of a scraper and an abrasive cleaning surface operative on a second surface of the plate opposite the cleaning surface and associated with a second polarity of the magnetic element, and
an outer component having
a body with a surface for engaging an exterior surface of an aquarium wall, and
a second magnetic element carried by the body;
the body is positionable in a first position for magnetic attraction between the first polarity of the first magnetic element and the second magnetic element with the cleaning element adjacent the aquarium wall and removably positionable in a second position for initial magnetic repulsion followed by magnetic attraction between the second polarity of the first magnetic element and the second magnetic element with the second surface adjacent the aquarium wall, moving the body between said first and second positions sequentially causing orientation of the first and second magnetic elements for repulsive force to flip the inner component within the aquarium then attractive force to draw the inner component to the wall.

21. A method for cleaning an aquarium comprising the steps of:
providing an inner component having a plate with a cleaning surface and an alternative cleaning element operative on a second surface of the plate opposite the cleaning surface with a magnetic clement carried by the plate, and means for providing orienting buoyancy proximate one end of the plate;
providing an outer component having a body with a surface for engaging an exterior surface of an aquarium wall, and a second magnetic element carried by the body;
positioning the body in a first position for magnetic attraction between the first and second magnetic elements with the cleaning surface adjacent the aquarium wall;
positioning the body in a second position causing magnetic repulsion between the first and second magnetic elements to flip the inner component within the aquarium and for magnetic attraction between the first arid second magnetic elements with the second surface adjacent the aquarium wall.

22. A method for cleaning an aquarium as defined in claim 21 further comprising the step of moving the body between said first and second positions sequentially causing orientation of the first and second magnetic elements for repulsive then attractive force to alternate the cleaning element operable on the aquarium surface.

* * * * *